US008345766B2

(12) United States Patent
Ratakonda et al.

(10) Patent No.: US 8,345,766 B2
(45) Date of Patent: Jan. 1, 2013

(54) BANDWIDTH ADAPTIVE STREAM SELECTION

(75) Inventors: Krishna Ratakonda, Yorktown Heights, NY (US); Deepak S. Turaga, Elmsford, NY (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 12/128,935

(22) Filed: May 29, 2008

(65) Prior Publication Data

US 2008/0225953 A1 Sep. 18, 2008

Related U.S. Application Data

(63) Continuation of application No. 11/328,892, filed on Jan. 10, 2006, now abandoned.

(51) Int. Cl.
*H04N 7/12* (2006.01)
(52) U.S. Cl. .................................. 375/240.21
(58) Field of Classification Search .......... 370/464–465, 370/468, 477; 375/240, 240.01, 240.21; 348/384.1, 426.1, 427.1, 429.1, 430.1
See application file for complete search history.

(56) References Cited

U.S. PATENT DOCUMENTS

| | | | |
|---|---|---|---|
| 5,469,212 A * | 11/1995 | Lee ......................... 375/240.23 |
| 6,185,254 B1 * | 2/2001 | Ogata ...................... 375/240.19 |
| 6,292,589 B1 | 9/2001 | Chow et al. |
| 6,591,398 B1 * | 7/2003 | Kondo et al. ..................... 714/2 |
| 6,747,991 B1 * | 6/2004 | Hemy et al. .................. 370/468 |
| 7,233,619 B1 * | 6/2007 | Roman .................... 375/240 |
| 2002/0191116 A1 | 12/2002 | Kessler et al. |
| 2003/0081626 A1 * | 5/2003 | Naor et al. .................... 370/431 |
| 2003/0135863 A1 * | 7/2003 | Van Der Schaar .............. 725/95 |
| 2004/0145433 A1 | 7/2004 | Saito et al. |
| 2004/0156433 A1 * | 8/2004 | Comer et al. ............... 375/240.2 |
| 2004/0167925 A1 | 8/2004 | Visharam et al. |
| 2004/0172478 A1 | 9/2004 | Jacobs et al. |
| 2004/0199653 A1 | 10/2004 | Amini et al. |
| 2004/0215802 A1 | 10/2004 | Amini et al. |
| 2004/0240390 A1 | 12/2004 | Seckin et al. |
| 2004/0257465 A1 * | 12/2004 | Rumreich .................. 348/423.1 |
| 2005/0024486 A1 * | 2/2005 | Ratnakar et al. ........... 348/14.13 |
| 2006/0034334 A1 * | 2/2006 | Biederman ................... 370/477 |
| 2007/0160127 A1 | 7/2007 | Ratakonda et al. |

* cited by examiner

*Primary Examiner* — Omar Ghowrwal
(74) *Attorney, Agent, or Firm* — F. Chau & Associates; Anne V. Dougherty, Esq.

(57) ABSTRACT

An apparatus and corresponding method are provided for selecting one of several alternate input streams for transmission, the method including determining bandwidth requirements for each of the alternate input streams, measuring bandwidth currently available for transmission, and selecting for transmission one of the alternate input streams that has the highest determined bandwidth requirement less than or equal to the measured bandwidth currently available for transmission.

16 Claims, 5 Drawing Sheets

| | 3 B-frames | | | | | 2 B-frames | | | | 1 B-frame | | | 0 B-s | |
|---|---|---|---|---|---|---|---|---|---|---|---|---|---|---|
| | I | Be | Bo | Be | P | I | Be | Bo | P | I | Be | P | I | P |
| S1 | I | Be | Bo | Be | P | I | Be | Bo | P | I | Be | P | I | P |
| S2 | I | Be | - | Be | P | I | Be | - | P | I | - | P | I | - |
| S3 | I | - | Bo | - | P | I | - | - | P | I | - | P | | |
| S4 | I | - | - | - | P | I | - | - | - | | | | | |
| S5 | I | - | - | - | - | | | | | | | | | |

FIG. 4 ized to a user-selected granularity. The value 0xFF3E may indicate that the entire stream cannot be reduced, for example.

BANDWIDTH ADAPTIVE STREAM SELECTION

CROSS-REFERENCE TO RELATED APPLICATION

This is a continuation application of U.S. application Ser. No. 11/328,892, filed on Jan. 10, 2006 now abandoned, and entitled "BANDWIDTH ADAPTIVE STREAM SELECTION", which is incorporated by reference herein in its entirety.

BACKGROUND

Conventional multi-media streaming systems typically stream a single audio stream and a single associated video stream from a source to a destination. The combined bandwidth of the audio and video streams is the required channel bandwidth between the source and destination. If this channel bandwidth is reduced due to network congestion, for example, conventional systems have very limited means of adequately dealing with the reduction. Modern multi-media delivery systems therefore employ various techniques that allow a source to adapt to the changing source-destination bandwidth.

Video data is generally processed and transferred in the form of bit streams. Rate control involves the process of allocating bits for a group of pictures, a picture, a slice or a macroblock. A desirable rate control scheme should maximize picture quality for a given bit-rate. There are three general types of rate control, including constant bit-rate, variable bit-rate and exact bits. The length of a sequence may or may not be known. If it is known, one can achieve exact bits for the compressed stream, which can be useful for some storage applications. Constant bit-rate can be used for constant bit-rate transmission channels, such as in broadcast, for example. Constant bit-rate only requires a small buffer and is normally used in a push mode. Variable bit-rate can be used for variable bandwidth channels, such as for digital video disks. Variable bit-rate typically requires a large buffer and is normally used in a pull mode. Because any channel has a limited bandwidth, variable bit-rate has two parameters. One variable bit-rate parameter is maximum bit-rate, and the other is average bit-rate. The variable bit-rate maximum bit-rate is set for a channel, and the variable bit-rate average bit-rate is set for storage space.

A typical technique is to make multiple alternate audio and video streams available to the source, where the alternate streams are encodings of the same content but with different bandwidths. This gives the source choices from which to select the most appropriate audio/video streams for transmission to the destination.

Unfortunately, such prior methods have drawbacks such as inadequate adaptation to the changing source-destination bandwidth or bit-rate, high picture quality variation and blocking within pictures. Embodiments of the present disclosure address these and other issues.

SUMMARY

These and other drawbacks and disadvantages of the prior art are addressed by an apparatus and corresponding method for bandwidth adaptive stream selection.

An exemplary apparatus for selecting one of a plurality of alternate input streams for transmission includes input determination means for determining bandwidth requirements for each of the plurality of alternate input streams, output measurement means for measuring bandwidth currently available for transmission, and stream selection means for selecting for transmission one of the plurality of alternate input streams that has the highest determined bandwidth requirement less than or equal to the measured bandwidth currently available for transmission.

The exemplary apparatus may further include an encoder in signal communication with the input determination means, a sub-sampler in signal communication between the input determination means and the stream selection means, and a receiver in signal communication with the output measurement means.

A corresponding exemplary method for selecting one of several alternate input streams for transmission includes determining bandwidth requirements for each of the alternate input streams, measuring bandwidth currently available for transmission, and selecting for transmission one of the alternate input streams that has the highest determined bandwidth requirement less than or equal to the measured bandwidth currently available for transmission.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches bandwidth adaptive stream selection in accordance with the following exemplary figures, in which:

FIG. 4 shows a table of streams with frame types for bandwidth adaptive stream selection in accordance with the principles of the present disclosure.

DETAILED DESCRIPTION OF PREFERRED EMBODIMENTS

The present disclosure defines a method for dynamically selecting the appropriate alternate stream and an optional sub-sampling thereof that is responsive to input and output bandwidth. Thus, the stream bandwidth may be optimally matched to the source-destination channel capacity at all times.

In further embodiments, each alternate stream is sub-sampled such that the source selectively transmits only parts of an alternate stream. This provides more choice in adapting the stream bandwidths to the actual source/destination channel capacities.

The streams may include data types such as video, audio, or video and audio. For example, if an encoder or other source produces more than one audio encoding stream, bandwidth adaptive stream selection may be used to chose the appropriate audio encoding to transmit for current or instantaneous network or transmission line conditions.

To make the selection method adapt to the ever changing dynamics of the system and the streams, an exemplary embodiment continuously measures both the source-destination channel capacity and all of the possible audio/video stream bandwidths from which a source can choose.

Figure 1:
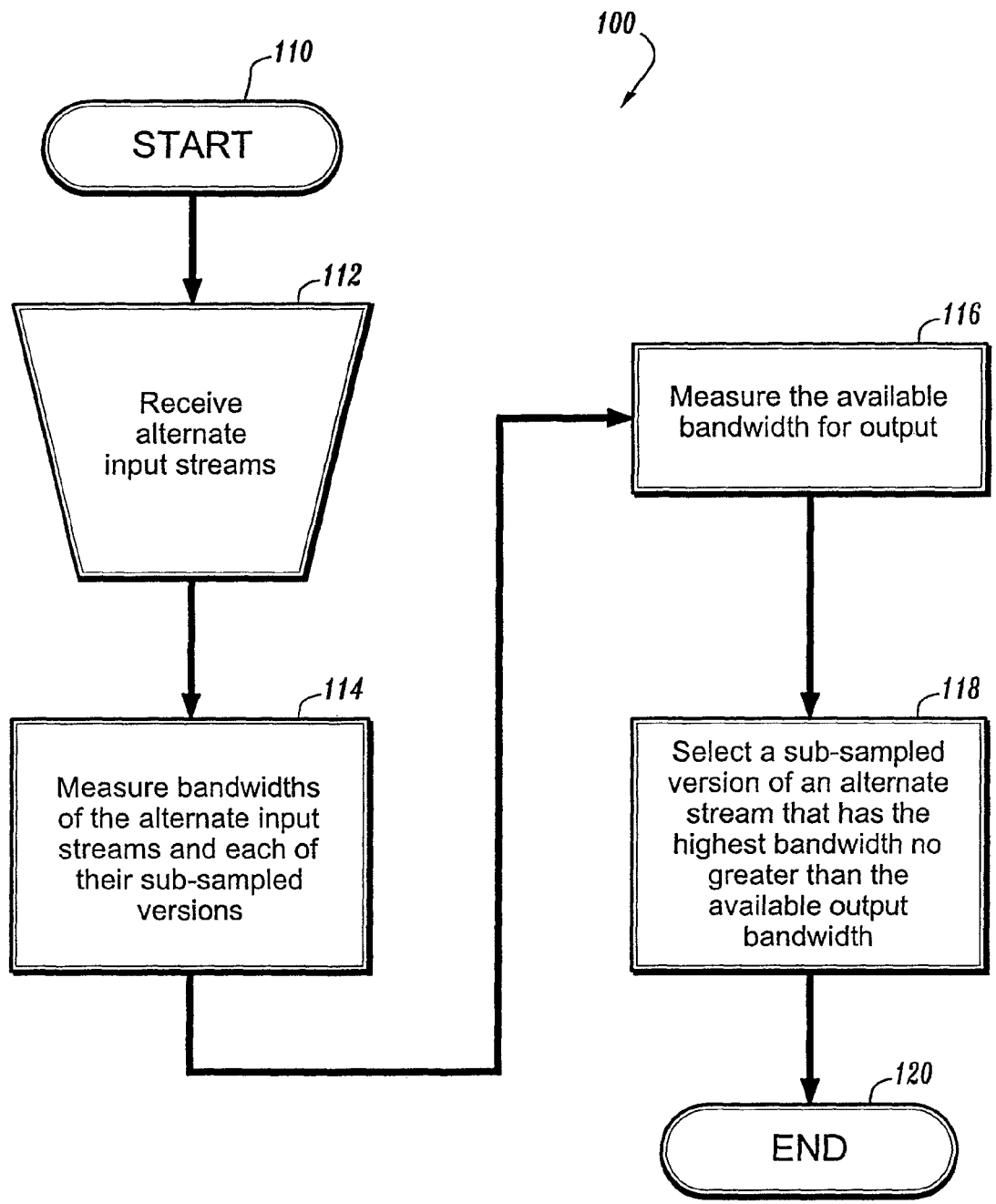
FIG. 1 shows a flow diagram for bandwidth adaptive stream selection in accordance with the principles of the present disclosure.

As shown in FIG. 1, a method for bandwidth adaptive stream selection is indicated generally by the reference numeral 100. The method includes a start block 110 that passes control to an input block 112. The input block 112 receives alternate input streams and their sub-sampled versions, and passes control to a function block 114. The function block 114 measures the bandwidths of the alternate input streams and each of their sub-sampled versions, and passes control to a function block 116. The function block 116, in turn, measures the available bandwidth for output, and passes control to a function block 118. The function block 118 selects one specific sub-sampled version of one specific alternate stream such that the selection has the highest bandwidth of all possible choices equal to or less than the available output bandwidth. The function block 118 passes control to an end block 120.

Figure 2:
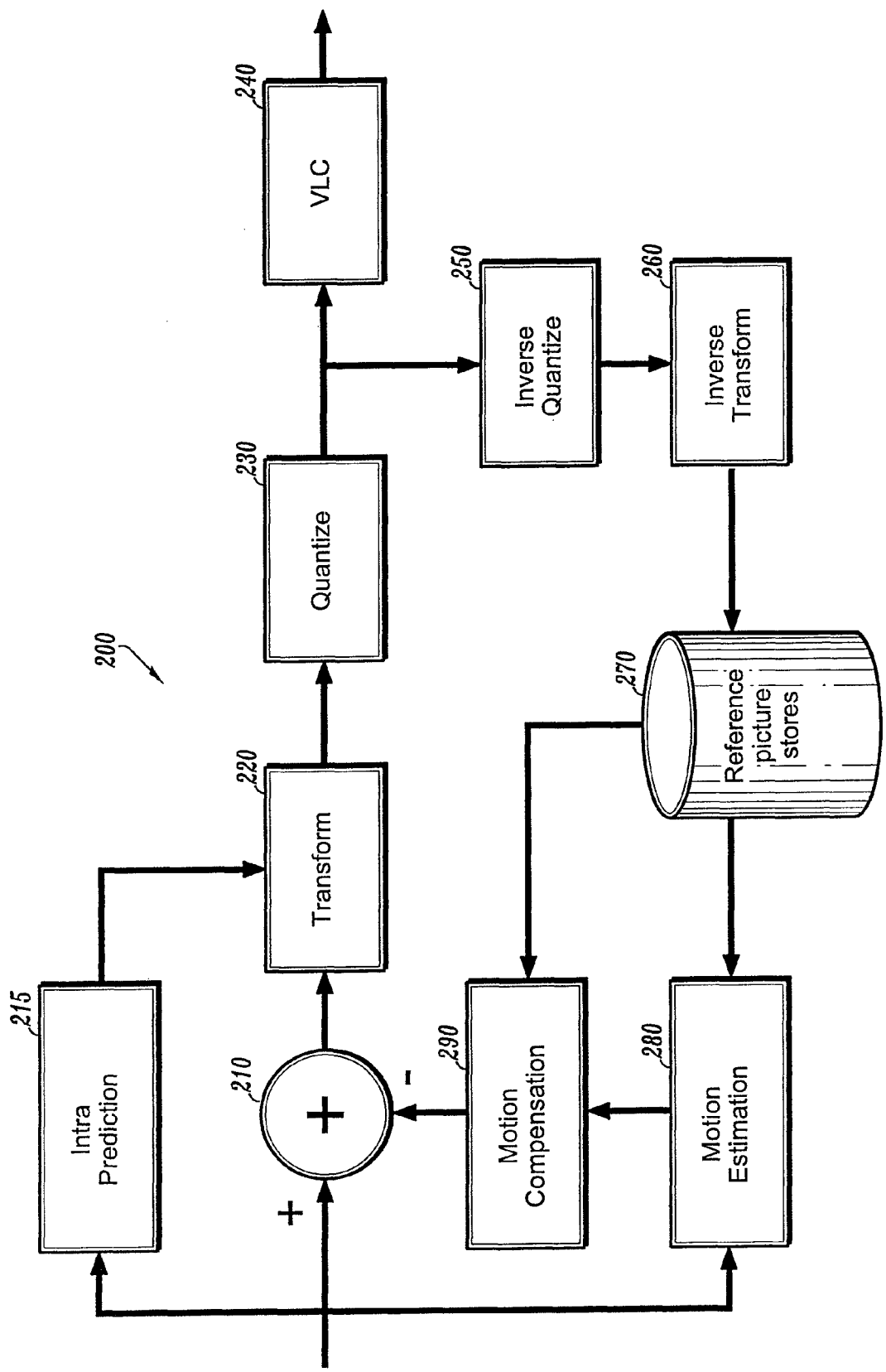
FIG. 2 shows a block diagram of a video encoder with bandwidth adaptive stream selection in accordance with the principles of the present disclosure.

Turning to FIG. 2, a video encoder for bandwidth adaptive stream selection is indicated generally by the reference numeral 200. An input to the encoder 200 is connected in signal communication with a non-inverting input of a summing junction 210. The output of the summing junction 210 is connected in signal communication with a block transform function 220.

The input to the encoder 200 is further connected in signal communication with an intra prediction block 215 for I pictures, which has its output connected to a second input of the transform 220. The transform 220 is connected in signal communication with a quantizer 230. It shall be understood that a separate quantizer parameter determination unit for rate control may feed the quantizer 230 in alternate embodiments, with the signaling between the units indicating which quantizer parameter to use. The output of the quantizer 230 is connected in signal communication with a variable length coder ("VLC") 240, where the output of the VLC 240 is an externally available output of the encoder 200.

The output of the quantizer 230 is further connected in signal communication with an inverse quantizer 250. The inverse quantizer 250 is connected in signal communication with an inverse block transform function 260, which, in turn, is connected in signal communication with a reference picture store 270. A first output of the reference picture store 270 is connected in signal communication with a first input of a motion estimator 280 for multiple reference pictures. The input to the encoder 200 is further connected in signal communication with a second input of the motion estimator 280.

The output of the motion estimator 280 is connected in signal communication with a first input of a motion compensator 290. A second output of the reference picture store 270 is connected in signal communication with a second input of the motion compensator 290. The output of the motion compensator 290 is connected in signal communication with an inverting input of the summing junction 210.

Figure 3:
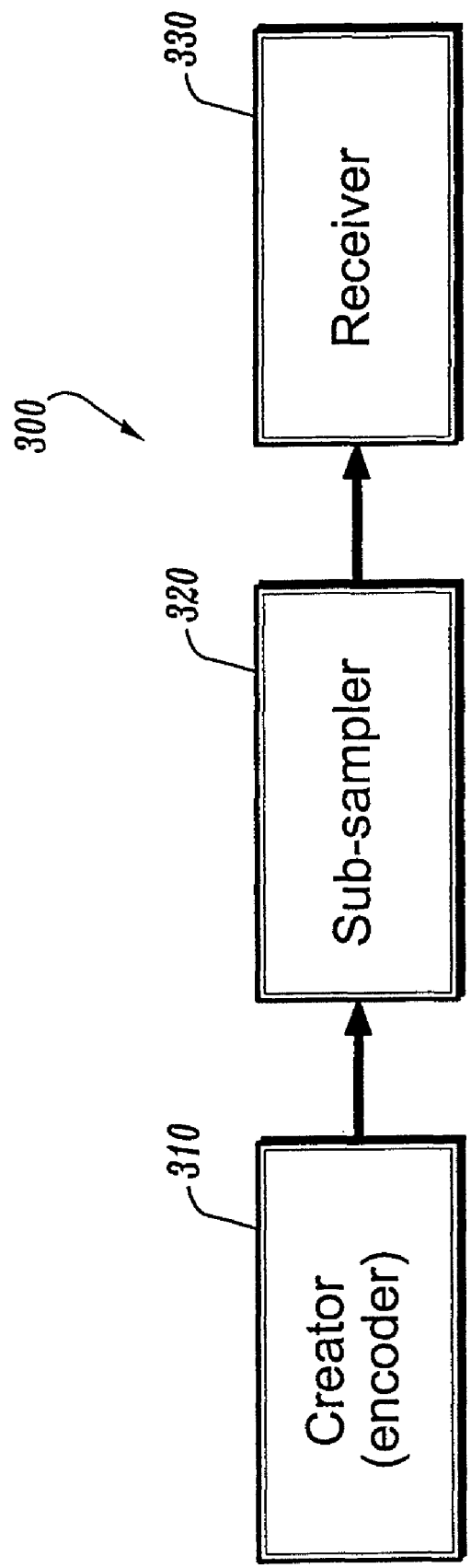
FIG. 3 shows a block diagram of a system with video encoding and sub-sampling for bandwidth adaptive stream selection in accordance with the principles of the present disclosure.

Turning now to FIG. 3, a system with video encoding and sub-sampling for bandwidth adaptive stream selection is indicated generally by the reference numeral 300. The system 300 includes an encoder 310 for creating a bit-stream, a sub-sampler 320 connected in signal communication with the encoder for sub-sampling the bit-stream, and a receiver 330 connected in signal communication with the sub-sampler for receiving the sub-sampled bit-stream.

As shown in FIG. 4, a table of streams with frame types for bandwidth adaptive stream selection is indicated generally by the reference numeral 400. The listed streams show the frames actually passed for segments comprising three B-frames, two B-frames, one B-frame and no B-frames, respectively. Thus, at the top of the table the stream S1 is fully passed without frame reduction by sub-sampling, while at the bottom of the table the stream S5 is substantially sub-sampled down to a single I-frame.

Figure 5:
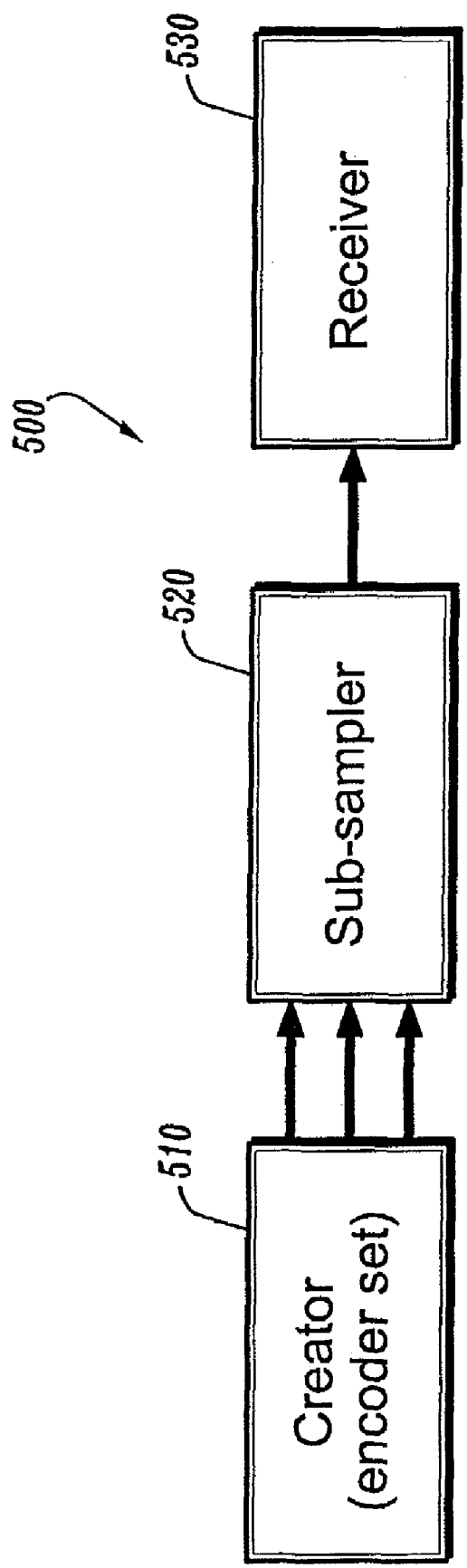
FIG. 5 shows a block diagram of a system with multiple stream video encoding and sub-sampling for bandwidth adaptive stream selection in accordance with the principles of the present disclosure.

Turning to FIG. 5, a system with multiple stream video encoding and sub-sampling for bandwidth adaptive stream selection is indicated generally by the reference numeral 500. The system 500 includes a multiple stream encoder 510 for creating multiple bit-streams, a sub-sampler 520 connected in signal communication with the encoder for sub-sampling the multiple bit-streams, and a receiver 330 connected in signal communication with the sub-sampler for receiving a sub-sampled bit-stream.

A stream is an encoding that consists of a sequence of frames of different types. For example, in an MPEG encoded video stream, one can distinguish between I, P and B-frames. A stream creator or encoder sends a complete stream that includes all of the frame types to a sub-sampler. The sub-sampler blocks certain frame types or passes them on to a receiver.

Referring back to FIG. 3, the encoder understands the streams and defines stream configurations that consist of only certain frame types. Because a configuration consists of a sub-set of frame types, it can also be seen as a sub-sampled version of the complete stream. It is the function of the sub-sampler to block or pass incoming frames according to the stream configuration that is currently in use.

Referring back to FIG. 4 for an exemplary case of MPEG video, the encoder can define multiple stream configurations $S_i$ depending on the number of B-frames. For example, if the encoder encodes an MPEG video stream with 1 B-frame, it will tell the sub-sampler that there are 3 different configurations possible:

1. No sub-sampling, i.e. pass all frames;
2. Sub-sample by dropping all B-frames;
3. Sub-sample by passing only the I-frames to the receiver.

Referring back to FIG. 5, an encoder may encode not just a single stream, but also multiple streams using the same source to allow for greater adaptivity. These alternate encodings will be for different bit rates, thereby allowing a sub-sampler more choice to match the receiver bandwidth since it can choose between alternate encodings, each with a choice of sub-sampling configuration.

Each configuration has an associated estimated bit rate. Upon setup, the stream configurations and corresponding bit rates are made known to the sub-sampler. During operation, the sub-sampler monitors two parameters:

1. the available bandwidth between itself and the receiver, and
2. the bit rate of the frame types and therefore the bit rates of the different stream configurations.

The sub-sampler uses this continuously updated information to select the alternate stream and sub-sampling configuration that matches the receiver bandwidth best. That is, it chooses the configuration that has the maximum bit-rate that is less than or equal to the available bandwidth.

For example, if an encoder creates two alternate MPEG video streams, one with 1 B-frame and one with no B-frames, the sub-sampler has a choice between 5 configurations:

1. No sub-sampling of alternate stream 0: pass frames I0, P0, and B0.

2. Block B-frames of alternate stream 0: pass frames I0 and P0.

3. Pass only I-frames of alternate stream 0: pass frames I0.

4. No sub-sampling of alternate stream 1: pass frames I1 and P1.

5. Pass only I-frames of alternate stream 1: pass frames I1.

At a given instant, the sub-sampler might measure the bit-rates of the frame types to be:

1. R(I0)=30 kb/s
2. R(P0)=90 kb/s
3. R(B0)=80 kb/s
4. R(I1)=20 kb/s
5. R(P1)=80 kb/s

The above basic bit-rates result in the following derived bit-rates for each configuration:

1. R(I0+P0+B0)=200 kb/s
2. R(I0+P0)=120 kb/s
3. R(I0)=30 kb/s
4. R(I1+P1)=100 kb/s
5. R(I1)=20 kb/s

Thus, if the available bandwidth to the receiver at that moment is 110 kb/s, the sub-sampler will select configuration 4 and send the complete alternate stream 1. Therefore, this exemplary embodiment provides a method for selecting one out of many alternate input streams and their sub-sampled versions, by measuring the bandwidths of the alternate input streams and each of their sub-sampled versions, measuring the available bandwidth for output, and selecting one specific sub-sampled version of one specific alternate stream such that the selection has the highest bandwidth of all possible choices equal to or less than the available output bandwidth.

Streams having different combinations of audio and video may be selected. In a case of extremely low channel bandwidth, for example, an exemplary selector may even sub-sample down as far as selecting only the stream with the lowest audio bandwidth while completely dropping the video stream.

In alternate embodiments, rate control may be used to provide alternate data streams for input to the selector. Rate control involves the process of allocating bits for a group of pictures, a picture, a slice and/or a macroblock. Preferred embodiments of the present disclosure assume that the length of a sequence is unknown. The group of pictures (GOP) is pictures between two adjacent intra coded pictures, and includes the first intra-coded picture.

Preferred embodiments of the present disclosure can meet bit-rate and/or storage requirements, avoid buffer overflow and underflow, encode good picture quality with a desired number of bits, limit picture quality variance between pictures, and encode good sequence quality at a desired bit-rate.

A bit limit may be used for a stream sequence, a GOP, a picture, a slice and/or a macroblock. The bit limit may assume, for example, that the total bits and/or length of a sequence is unknown, that a GOP means pictures between two adjacent I pictures, and that the initial picture bit limit ratio for I, P, and B types of pictures is I:P:B=6:3:1. The ratio may be updated after each GOP is encoded. For example, the initial bit limit ratio for a succeeding GOP may be initialized to the bit limit ratio resulting from the previous GOP. The bits may correspond to the maximum number of GOP bits, the average GOP bits, the previous GOP bits, and the total available bits.

An estimate of encoding complexity may be obtained for an I picture or intra block as the sum of absolute difference, for a P picture as the sum of absolute prediction difference, for a B picture as the sum of absolute bi-directional prediction difference, and for a macroblock as the sum of absolute difference.

An encoder buffer may be modeled by a Buffer size equal to the average bit-rate for 2-GOP bits. If the encoder buffer is in underflow, zeros may be appended. If the picture to be encoded might cause the encoder buffer to underflow, the picture size may be increased. If the picture to be encoded might cause the encoder buffer to overflow, the picture size may be reduced. The end-to-end delay may be determined from encoder buffer output delay. In one example, end-to-end delay may be determined from one picture. The end-to-end delay may be determined from any number of pictures in alternate embodiments, such as six pictures, for example. For other applications, end-to-end delay may be determined from the starting output stream when the buffer is half full.

The decoder buffer delay may be computed as well. When a picture is scheduled to be removed, all bits of the picture shall be in the decoder buffer. For some applications, the decoder buffer delay depends on the maximum number of bits for a picture. For other applications, the decoder buffer delay may be determined when the buffer is half full.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof. Moreover, the software is preferably implemented as an application program tangibly embodied on a non-transitory program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. For example, alternate embodiments may encode an exact average bit-rate when sequence length or capacity are known, implement bandwidth adaptive stream selection after using two complete two-pass encoding, optimize bit assignment inside of a picture, recognize a scene change, utilize a statistical multiplexer, and/or implement stream selection for layered data, such as for MPEG. All such changes and modifications are intended to be included within the scope of the present disclosure as set forth in the appended claims.

What is claimed is:

1. A method of communicating audio-video information to a receiver, the method comprising:
   determining bandwidth requirements for each of multiple alternate input streams, the multiple alternate input streams comprising at least one group of pictures (GOP), the GOP comprising I pictures, P pictures and B pictures;
   sub-sampling the multiple alternate input streams by filtering the B pictures before the P pictures, and the P pictures before the I pictures, to form multiple sub-sampled alternate input streams, the sub-sampling comprising filtering at least one picture from each GOP to form a plurality of sub-sampled alternate input streams, each of the plurality of sub-sampled alternate input streams having a different amount of pictures filtered from each GOP, wherein one picture is filtered from each GOP to form a first sub-sampled input stream, two pictures are filtered from each GOP to form a second sub-sampled input stream, three pictures are filtered from each GOP to form a third sub-sampled input stream, and four pictures are filtered from each GOP to form a fourth sub-sampled input stream;
   measuring bandwidth requirements of the sub-sampled alternate input streams;
   selecting for audio-video transmission one of the sub-sampled alternate input streams if it has a highest determined bandwidth requirement less than or equal to the measured bandwidth currently available for transmission, and
   transmitting the selected sub-sampled alternate input stream to the receiver.

2. An apparatus for communicating audio-video information to a receiver, the apparatus comprising a sub-sampler configured to:
   determine bandwidth requirements for each of multiple alternate input streams, the multiple input streams comprising at least one group of pictures (GOP), the GOP comprising I pictures, P pictures and B pictures;
   sub-sample the multiple alternate input streams by filtering B pictures before P pictures and P pictures before I pictures to form multiple sub-sampled alternate input streams, the sub-sampling comprising filtering at least one picture from each GOP to form a plurality of sub-sampled alternate input streams, each of the plurality of sub-sampled alternate input streams having a different amount of pictures filtered from each GOP, wherein one picture is filtered from each GOP to form a first sub-sampled input stream, two pictures are filtered from each GOP to form a second sub-sampled input stream, three pictures are filtered from each GOP to form a third sub-sampled input stream, and four pictures are filtered from each GOP to form a fourth sub-sampled input stream;
   measure bandwidth requirements of the multiple sub-sampled alternate input streams;
   select for transmission the one of the sub-sampled alternate input streams if it has a highest determined bandwidth requirement less than or equal to the measured bandwidth currently available for transmission, and
   transmit the selected sub-sampled alternate input stream to the receiver,
   wherein the sub-sampler comprises a central processing unit (CPU), a random access memory (RAM) and input/output interfaces.

3. An apparatus as defined in claim 2, further comprising:
   an encoder in signal communication with the sub-sampler.

4. An apparatus as defined in claim 3 wherein the encoder provides at least one input stream to the sub-sampler.

5. An apparatus as defined in claim 3 wherein the encoder provides a plurality of alternate input streams to the sub-sampler.

6. An apparatus as defined in claim 3, the encoder comprising:
   an input terminal;
   a prediction unit in signal communication with the input terminal;
   a transform unit in signal communication with the prediction unit;
   a quantization unit in signal communication with the transform unit; and
   a variable length coding unit in signal communication with the quantization unit.

7. An apparatus as defined in claim 6, the encoder further comprising:
   an inverse quantization unit in signal communication with the quantization unit;
   an inverse transform unit in signal communication with the inverse quantization unit;
   a reference picture unit in signal communication with the inverse transform unit;
   a motion estimation unit in signal communication with each of the reference picture unit and the input terminal;
   a motion compensation unit in signal communication with each of the reference picture unit and the motion estimation unit; and
   a summing unit having a negative input in signal communication with the motion compensation unit, a positive input in signal communication with the input terminal, and an output in signal communication with the transform unit.

8. A non-transitory program storage device readable by computer, tangibly embodying a program of instructions executable by the computer to perform program steps for selecting one of a plurality of alternate input streams for audio-video information transmission to a receiver, the program steps comprising:
   determining bandwidth requirements for each of multiple alternate input streams, the multiple alternate input streams comprising at least one group of pictures (GOP), the GOP comprising I pictures, P pictures and B pictures;
   sub-sampling the multiple alternate input streams by filtering the B pictures before the P pictures, and the P pictures before the I pictures, to form multiple sub-sampled alternate input streams, the sub-sampling comprising filtering at least one picture from each GOP to form a plurality of sub-sampled alternate input streams, each of the plurality of sub-sampled alternate input streams having a different amount of pictures filtered from each GOP, wherein one picture is filtered from each GOP to form a first sub-sampled input stream, two pictures are filtered from each GOP to form a second sub-sampled input stream, three pictures are filtered from each GOP to form a third sub-sampled input stream, and four pictures are filtered from each GOP to form a fourth sub-sampled input stream;
   measuring bandwidth requirements of the multiple sub-sampled alternate input streams;
   selecting for audio-video transmission one of the multiple sub-sampled alternate input streams if it has a highest determined bandwidth requirement less than or equal to the measured bandwidth currently available for transmission, and transmitting the selected sub-sampled alternate input stream to the receiver.

9. A method of communicating MPEG audio-video information to a receiver, the method comprising:
   determining bandwidth requirements for each of multiple alternate input streams to provide determined bandwidth requirements;
   measuring bandwidth currently available for audio-video information transmission to provide measured bandwidth;
   if the determined bandwidth requirements for each of the multiple alternate input streams is greater than the measured bandwidth, sub-sampling at least one of the multiple alternate input streams comprising at least one group of pictures (GOP), the GOP comprising I pictures, B pictures and P pictures, by filtering B pictures before P pictures and P pictures before I pictures, to form sub-sampled alternate input streams and measuring bandwidth requirements of the at least one sub-sampled alternate input stream, the sub-sampling comprising filtering at least one picture from each GOP to form a plurality of sub-sampled alternate input streams, each of the plurality of sub-sampled alternate input streams having a different amount of pictures filtered from each GOP, wherein one picture is filtered from each GOP to form a first sub-sampled input stream, two pictures are filtered from each GOP to form a second sub-sampled input stream, three pictures are filtered from each GOP to form a third sub-sampled input stream, and four pictures are filtered from each GOP to form a fourth sub-sampled input stream;
   selecting for audio-video information transmission whichever one of the multiple alternate input streams or the sub-sampled alternate input streams has a highest determined bandwidth requirement less than or equal to the measured bandwidth currently available for audio-video information transmission, to provide a selected one; and
   transmitting the selected one to a receiver.

10. An apparatus for communicating MPEG audio-video information to a receiver, the apparatus comprising a sub-sampler configured to:
    determine bandwidth requirements for each of multiple alternate input streams, the multiple alternate input streams comprising at least one group of pictures (GOP) the GOP comprising MPEG I pictures, P pictures and B pictures;
    measure bandwidth currently available for audio-video information transmission; and
    select for MPEG audio-video information transmission one of the alternate input streams that has the highest determined bandwidth requirement less than or equal to measured bandwidth currently available for audio-video information transmission,
    sub-sample each of the multiple alternate input streams by filtering the B pictures before the P pictures and the P pictures before the I pictures, to form sub-sampled input streams, the sub-sampling comprising filtering at least one picture from each GOP to form a plurality of sub-sampled alternate input streams, each of the plurality of sub-sampled alternate input streams having a different amount of pictures filtered from each GOP, wherein one picture is filtered from each GOP to form a first sub-sampled input stream, two pictures are filtered from each GOP to form a second sub-sampled input stream, three pictures are filtered from each GOP to form a third sub-sampled input stream, and four pictures are filtered from each GOP to form a fourth sub-sampled input stream;
    measure the bandwidth requirements of the sub-sampled input streams; and
    select for audio-video information transmission the sub-sampled alternate input stream if it has a highest determined bandwidth requirement less than or equal to the measured bandwidth currently available for audio-video information transmission,
    wherein the sub-sampler comprises a central processing unit (CPU), a random access memory (RAM) and input/output interfaces.

11. The apparatus of claim 10, further comprising:
    an encoder in signal communication with the sub-sampler.

12. The apparatus of claim 11, wherein the encoder provides at least one input stream to the sub-sampler.

13. The apparatus of claim 11, wherein the encoder provides alternate input streams to the sub-sampler.

14. The apparatus of claim 11, the encoder comprising:
    an input terminal;
    a prediction unit in signal communication with the input terminal;
    a transform unit in signal communication with the prediction unit;
    a quantization unit in signal communication with the transform unit; and
    a variable length coding unit in signal communication with the quantization unit.

15. The apparatus of claim 14, the encoder further comprising:
    an inverse quantization unit in signal communication with the quantization unit;
    an inverse transform unit in signal communication with the inverse quantization unit;
    a reference picture unit in signal communication with the inverse transform unit;
    a motion estimation unit in signal communication with each of the reference picture unit and the input terminal;
    a motion compensation unit in signal communication with each of the reference picture unit and the motion estimation unit; and
    a summing unit having a negative input in signal communication with the motion compensation unit, a positive input in signal communication with the input terminal, and an output in signal communication with the transform unit.

16. A non- transitory program storage device readable by computer, tangibly embodying a program of instructions executable by the computer to perform program steps for communicating MPEG audio-video information to a receiver, the program steps comprising:
    determining bandwidth requirements for each of multiple alternate input streams to provide determined bandwidth requirements, the multiple alternate input streams comprising at least one group of pictures (GOP), the GOP comprising I pictures, P pictures and B pictures;
    measuring bandwidth currently available for audio-video information transmission to provide measured bandwidth;
    if the determined bandwidth requirements for each of the multiple alternate input streams is greater than the measured bandwidth, sub-sampling at least one of the multiple alternate input streams by filtering B pictures before P pictures and P pictures before I pictures, and measuring bandwidth requirements of the at least one sub-sampled alternate input stream, the sub-sampling comprising filtering at least one picture from each GOP to form a plurality of sub-sampled alternate input streams, each of the plurality of sub-sampled alternate input streams having a different amount of pictures filtered from each GOP, wherein one picture is filtered from each GOP to form a first sub-sampled input stream, two pictures are filtered from each GOP to form a second sub-sampled input stream, three pictures are filtered from each GOP to form a third sub-sampled input stream, and four pictures are filtered from each GOP to form a fourth sub-sampled input stream;

selecting for audio-video information transmission whichever one of the multiple alternate input streams or the sub-sampled alternate input streams has a highest determined bandwidth requirement less than or equal to the measured bandwidth currently available for audio-video information transmission, to provide a selected one; and transmitting the selected one to a receiver.

* * * * *